(12) United States Patent
Yang et al.

(10) Patent No.: US 8,452,794 B2
(45) Date of Patent: May 28, 2013

(54) VISUAL AND TEXTUAL QUERY SUGGESTION

(75) Inventors: Linjun Yang, Beijing (CN); Meng Wang, Singapore (SG); Zhengjun Zha, Hefei (CN); Tao Mei, Beijing (CN); Xian-Sheng Hua, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 61 days.

(21) Appl. No.: 12/369,421

(22) Filed: Feb. 11, 2009

(65) Prior Publication Data

US 2010/0205202 A1 Aug. 12, 2010

(51) Int. Cl.
G06F 7/00 (2006.01)
G06F 17/30 (2006.01)

(52) U.S. Cl.
USPC .......................................................... 707/767

(58) Field of Classification Search
None
See application file for complete search history.

(56) References Cited

U.S. PATENT DOCUMENTS

| | | | |
|---|---|---|---|
| 5,630,121 A | 5/1997 | Braden-Harder et al. | |
| 5,680,636 A | 10/1997 | Levine et al. | |
| 5,852,823 A | 12/1998 | De Bonet | |
| 5,987,457 A | 11/1999 | Ballard | |
| 6,272,484 B1 | 8/2001 | Martin et al. | |
| 6,397,181 B1 | 5/2002 | Li et al. | |
| 6,415,282 B1* | 7/2002 | Mukherjea et al. ........... | 707/737 |
| 6,687,416 B2 | 2/2004 | Wang | |
| 6,850,644 B1 | 2/2005 | Shin et al. | |
| 6,970,860 B1 | 11/2005 | Liu et al. | |
| 7,028,253 B1 | 4/2006 | Lieberman et al. | |
| 7,043,094 B2 | 5/2006 | Thomas et al. | |
| 7,099,860 B1 | 8/2006 | Liu et al. | |
| 7,162,691 B1 | 1/2007 | Chatterjee et al. | |
| 7,209,815 B2 | 4/2007 | Grier et al. | |
| 7,231,381 B2 | 6/2007 | Li et al. | |
| 7,234,106 B2 | 6/2007 | Simske | |
| 7,283,992 B2 | 10/2007 | Liu et al. | |
| 2003/0110181 A1* | 6/2003 | Schuetze et al. ........... | 707/103 R |
| 2003/0123737 A1* | 7/2003 | Mojsilovic et al. ........... | 382/224 |

(Continued)

FOREIGN PATENT DOCUMENTS

WO WO02099697 A1 12/2002

OTHER PUBLICATIONS

Riaz et al, "Efficient Image Retrieval Using Adaptive Segmentation of HSV Color Space", International Conference on Computational Sciences and its Applications ICCSA 2008, 6 pages.*

(Continued)

*Primary Examiner* — Uyen Le
(74) *Attorney, Agent, or Firm* — Lee & Hayes, PLLC

(57) ABSTRACT

Techniques described herein enable better understanding of the intent of a user that submits a particular search query. These techniques receive a search request for images associated with a particular query. In response, the techniques determine images that are associated with the query, as well as other keywords that are associated with these images. The techniques then cluster, for each set of images associated with one of these keywords, the set of images into multiple groups. The techniques then rank the images and determine a representative image of each cluster. Finally, the tools suggest, to the user that submitted the query, to refine the search based on user selection of a keyword and a representative image. Thus, the techniques better understand the user's intent by allowing the user to refine the search based on another keyword and based on an image on which the user wishes to focus the search.

18 Claims, 5 Drawing Sheets

U.S. PATENT DOCUMENTS

| | | | |
|---|---|---|---|
| 2004/0049734 A1 | 3/2004 | Simske | |
| 2004/0205545 A1 | 10/2004 | Bargeron et al. | |
| 2004/0225686 A1 | 11/2004 | Li et al. | |
| 2004/0267733 A1 | 12/2004 | Kim | |
| 2005/0004910 A1 | 1/2005 | Trepess | |
| 2005/0055344 A1* | 3/2005 | Liu et al. | 707/3 |
| 2005/0071365 A1 | 3/2005 | Hou et al. | |
| 2005/0131951 A1 | 6/2005 | Zhang et al. | |
| 2005/0165763 A1 | 7/2005 | Li et al. | |
| 2005/0228825 A1 | 10/2005 | Yang | |
| 2005/0235272 A1 | 10/2005 | Skinner | |
| 2006/0020597 A1 | 1/2006 | Keating et al. | |
| 2006/0041564 A1 | 2/2006 | Jain et al. | |
| 2006/0061595 A1 | 3/2006 | Goede et al. | |
| 2006/0155684 A1 | 7/2006 | Liu et al. | |
| 2006/0161520 A1* | 7/2006 | Brewer et al. | 707/3 |
| 2006/0173909 A1 | 8/2006 | Carlson et al. | |
| 2006/0195858 A1 | 8/2006 | Takahashi et al. | |
| 2006/0206475 A1 | 9/2006 | Naam et al. | |
| 2007/0005571 A1 | 1/2007 | Brewer et al. | |
| 2007/0052734 A1 | 3/2007 | Skinner et al. | |
| 2007/0067345 A1 | 3/2007 | Li et al. | |
| 2007/0133947 A1* | 6/2007 | Armitage et al. | 386/95 |
| 2007/0174269 A1 | 7/2007 | Jing et al. | |
| 2007/0174320 A1 | 7/2007 | Chou | |
| 2007/0214114 A1 | 9/2007 | Liu et al. | |
| 2007/0239778 A1 | 10/2007 | Gallagher | |
| 2007/0276820 A1 | 11/2007 | Iqbal | |
| 2008/0071744 A1* | 3/2008 | Yom-Tov | 707/3 |
| 2008/0267503 A1 | 10/2008 | Denoue et al. | |
| 2009/0094234 A1* | 4/2009 | Marvit et al. | 707/5 |
| 2010/0114888 A1* | 5/2010 | Van Zwol et al. | 707/737 |
| 2010/0114908 A1* | 5/2010 | Chand et al. | 707/748 |

OTHER PUBLICATIONS

Zhu et al, "New query refinement and semantics integrated image retrieval system with semiautomatic annotation scheme", Journal of Electronic Imaging, vol. 10(4) pp. 850-860, Oct. 2001.*

Baeza-Yates et al., "Query Recommendation using Query Logs in Search Engines", retrieved on Dec. 31, 2008 at <<http://www.dcc.uchile.cl/~churtado/clustwebLNCS.pdf>>, 10 pages.

Beeferman, et al., "Agglomerative Clustering of a Search Engine Query Log", retrieved on Dec. 31, 2008 at <<http://www.dougb.com/papers/kdd.pdf>>, 10 pages.

Burstein, "Building an IE8 Visual Search Suggestion Provider for my Twitter Friends", retrieved on Dec. 31, 2008 at <<http://blogs.microsoft.co.il/blogs/bursteg/archive/2008/12/17/building-an-ie8-visual-search-suggestion-provider-for-my-twitter-friends.aspx>>, 13 pgs.

Carpineto, et al., "An Information Theoretic Approach to Automatic Query Expansion", retrieved on Dec. 31, 2008 at <<http://search.fub.it/claudio/pdf/TOIS2001.pdf>>, 35 pages.

Crum, "Yahoo Suggestions for Image Search", retrieved on Dec. 31, 2008 at <<http://www.webpronews.com/topnews/2008/12/03/yahoo-suggestions-for-image-search>>, Dec. 3, 2008, pp. 1-4.

Datta, et al., "Image Retrieval: Ideas, Influences, and Trends of the New Age", retrieved on Dec. 31, 2008 at <<http://infolab.stanford.edu/~wangz/project/imsearch/review/JOUR/datta.pdf>>, ACM Computing Surveys, vol. 40, No. 2, Article 5, Publication date : Apr. 2008, 60 pages.

Flickner, et al., "Query by Image and Video Content: The QBIC System", retrieved on Dec. 31, 2008 at <<http://www.cis.temple.edu/~vasilis/Courses/CIS750/Papers/qbic.pdf>>, IBM Almaden Research Center, IEEE Sep. 1995, pp. 23-32.

"Flickr", retrieved on Dec. 31, 2008 at <<http://www.flickr.com/>>, 1 pg.

Frey, et al., "Clustering by Passing Messages Between Data Points", retrieved on Dec. 31, 2008 at <<http://www.psi.toronto.edu/affinitypropagation/FreyDueckScience07.pdf>>, Science Magazine, vol. 315, Feb. 16, 2007, 23 pages.

"Google Image Search", retrieved on Dec. 31, 2008 at <<http://images.google.com/>>, Google, 2008, 1 pg.

He, et al., "Learning an Image Manifold for Retrieval", retrieved on Dec. 31, 2008 at <<http:delivery.acm.org/10.1145/1030000/1027532/p17-he.pdf?key1=1027532&key2=4414980321&coll=GUIDE&dl=GUIDE&CFID=16377253&CFTOKEN=92469850>>, MM 2004, Oct. 10-16, New York, USA, pp. 17-23.

"How Do You Create Search Features for Internet Explorer 8 Beta 2?", retrieved on Dec. 31, 2008 at <<http://www.code-magazine.com/article.aspx?quickid=0811072&page=2>>, CoDe Magazine, 2008, vol. 5, Issue 3, IE8, 9 pages.

Huang, et al., "Spatial Color Indexing and Applications", retrieved on Dec. 31, 2008 at <<http://ieeexplore.ieee.org/stamp/stamp.jsp?arnumber=710779&isnumber=15374>>, IEEE Xplore, pp. 602-607.

Jia, et al., "Finding Image Exemplars Using Fast Sparse Affinity Propogation", retrieved on Dec. 31, 2008 at <<http://delivery.acm.org/10.1145/1460000/1459448/p639-jia.pdf?key1=1459448&key2=6654980321&coll=GUIDE&dl=GUIDE&CFID=16934217&CFTOKEN=19327438>>, MM 2008, Oct. 26-31, Vancouver, BC, Canada, pp. 639-642.

Lew, et al., "Content-based Multimedia Information Retrieval: State of the Art and Challenges", retrieved on Dec. 31, 2008 at <<http://www.liacs.nl/home/mlew/mir.survey16b.pdf>>, ACM Transactions on Multimedia Computing, Communications, and Applications, Feb. 2006, 26 pgs.

"Live Image Search", retrieved on Dec. 31, 2008 at <<http://image.live.com>>, Microsoft Corp., 2009, 1 pg.

Sigurbjornsson, et al, "Flickr Tag Recommendation based on Collective Knowledge", retrieved on Dec. 31, 2008 at <<http://www2008.org/papers/pdf/p327-sigurbjornssonA.pdf>>, WWW 2008, Apr. 21-25, Beijing, China, pp. 327-336.

Smeulders, et al., "Content-Based Image Retrieval at the End of the Early Years", retrieved on Dec. 31, 2008 at <<http://.ieeexplore.ieee.org/stamp/stamp.jsp?arnumber=00895972>>, IEEE Transactions on Pattern Analysis and Machine Intellegence, vol. 22, No. 12, Dec. 2000, pp. 1349-1380.

Snoek, et al., "MediaMill: Video Search Using a Thesaurus of 500 Machine Learned Concepts", retrieved on Dec. 31, 2008 at <<http://staff.science.uva.nl/~cgmsnoek/pub/snoek-demo-samt2006.pdf>>, Intelligent Systems Lab Amsterdam, Informatics Institute, University of Amsterdam, The Netherlands, pp. 1-2.

Swets, et al., "Using Discriminant Eigenfeatures for Image Retrieval", IEEE Transactions on Pattern Analysis and Machine Intelligence, vol. 18, 1996, pp. 831-836, 6 pgs.

Weingerger, et al., "Resolving Tag Ambiguity", retrieved on Dec. 31, 2008 at <<http://research.yahoo.com/files/ctfp6043-weinberger.pdf>>, MM 2008, Oct. 26-31, Vancouver, BC, Canada, 9 pages.

Wen, et al., "Clustering User Queries of a Search Engine", retrieved on Dec. 31, 2008 at <<https://research.microsoft.com/en-us/um/people/jrwen/jrwen_files/publications/QC-WWW10.pdf>>, WWW10, May 1-5, 2001, Hong Kong, pp. 162-168.

Worring, et al., "The MediaMill Large-lexicon Concept Suggestion Engine", retrieved on Dec. 31, 2008 at <<http://staff.science.uva.nl/~cgmsnoek/pub/worring-demo-acm2006.pdf>>, MM 2006, Oct. 23-27, Santa Barbara, CA., 2 pages.

"XML Search Suggestions Format Specification", retrieved on Dec. 31, 2008 at <<http://msdn.microsoft.com/en-us/library/cc848863(VS.85).aspx>>, Microsoft Corporation 2009, 6 pages.

Xu, et al., "Query Expansion Using Local and Global Document Analysis", retrieved on Dec. 31, 2008 at <<http://citeseerx.ist.psu.edu/viewdoc/download?doi=10.1.1.49.3174&rep=rep1&type=pdf>>, Center for Intelligent Information Retrieval, Computer Science Department, University of Massachusetts, MA., 8 pages.

Xue, et al., "Improving Web Search Using Image Snippets", retrieved on Dec. 31, 2008 at <<http://cs.nju.edu.cn/zhouzh/zhouzh.files/publication/toit08.pdf>>, ACM 2008, 27 pages.

"Yahoo! Image Search", retrieved on Dec. 31, 2008 at <<http://images.search.yahoo.com/>>, Yahoo! 2008, 1 pg.

Yu, et al., "Improving Pseudo-Relevance Feedback in Web Information Retrieval Using Web Page Segmentation", retrieved on Dec. 31, 2008 at <<http://www2003.org/cdrom/papers/refereed/p300/p300-Yu.html>>, WWW2003, May 20-24, 2003, Budapest, Hungary, 13 pages.

Zhou, et al., "Ranking on Data Manifolds", retrieved on Dec. 31, 2008 at <<http://www.kyb.mpg.de/publications/pdfs/pdf2334.pdf>>, Max Planck Institute for Biological Cybernetics, Germany, 8 pages.

Boyd, et al., "Convex Optimization", Book, Cambridge University Press, Mar. 2004, 730 pages.

Lam-Adesina, et al., "Applying Summarization Techniques for Term Selection in Relevance Feedback", ACM, New York, New York, Annual ACM Conference on Research and Development in Information Retrieval, Proceedings of the 24th annual international ACM SIGIR conference on Research and development in information retrieval, Sep. 2001, pp. 1-9.

Cascia, et al., "Combining Textual and Visual Cues for Content-based Image Retrieval on the World Wide Web", retrieved at <<http://www.cs.bu.edu/techreports/pdf/1998-004-combining-text-and-vis-cues.pdf>>, IEEE, BU CS TR98-004, Jun. 1998, 5 pgs.

Guo, et al., "Enhanced Max Margin Learning on Multimodal Data Mining in a Multimedia Database", retrieved at http://delivery.acm.org/10.1145/1290000/1281231/p340-guo.pdf?key1=1281231&key2=0098944911&coll=GUIDE&dl=&CFID=15151515&CFTOKEN=6184618>>, ACM, KDD'07, Aug. 12-15, 2007, pp. 340-349.

Hua, et al., "Semantic Knowledge Extraction and Annotation for Web Images", In the Proceedings of the 13th Annual ACM International Conference on Multimedia, Nov. 2005, pp. 467-470.

Inoue, "On the Need for Annotation-Based Image Retrieval", available at least as early as Nov. 7, 2007, at http://research.nii.ac.jp/~m-inoue/paper/inoue04irix.pdf>>, National Institute of Informatics, Tokyo, Japan, 3 pgs.

Jeon, et al., "Automatic Image Annotation and Retrieval using Cross-Media Relevance Models", at <<http://ciir.cs.umass.edu/pubfiles/mm-41.pdf>>, ACM, SIGIR'03, Jul. 28-Aug. 1, 2003, 8 pgs.

Jin, et al., "Effective Automatic Image Annotation via a Coherent Language Model and Active Learning", available at least as early as Jun. 12, 2007, at <<http://delivery.acm.org/10.1145/1030000/1027732/p892-jin.pdf?key1=1027732&key2=2189361811&coll=GUIDE&dl=GUIDE&CFID=21118987&CFTOKEN=73358540, ACM, MM'04, Oct. 10-16, 2004, pp. 892-899.

Jing et al, "An Effective Region-Based Image Retrieval Framework," ACM, Multimedia '02 Proceedings of the tenth ACM international conference on Multimedia, Dec. 2002, 10 pgs.

Kang, et al., "Regularizing Translation Models for Better Automatic Image Annotation", available at least as early as Jun. 12, 2007, at <<http://delivery.acm.org/10.1145/1040000/1031242/p350-kang.pdf?key1=1031242&key2=0070461811&coll=GUIDE&dl=GUIDE&CFID=21120579&CFTOKEN=59010486>>, ACM, CIKM'04, Nov. 8-13, 2004, pp. 350-359.

Li, et al., "Image Annotation by Large-Scale Content-based Image Retrieval", at <<http://delivery.acm.org/10.1145/1190000/1180764/p607-li.pdf?key1=1180764&key2=0704643811&coll=GUIDE&dl=GUIDE&CFID=22942426&CFTOKEN=26272205>>, ACM, MM'06, Oct. 23-27, 2006, pp. 607-610.

Li, et al., "Statistical Correlation Analysis in Image Retrieval", available at least as early as Jul. 4, 2007, at <<http://research.microsoft.com/~zhengc/papers/PR02li.pdf>>, 12 pgs.

Liu, et al., "An Adaptive Graph Model for Automatic Image Annotation", available at least as early as Jun. 12, 2007, at <<http://delivery.acm.org/10.1145/1180000/1178689/p61-liu.pdf?key1=1178689&key2=6322461811&coll=GUIDE&dl=GUIDE&CFID=21123267&CFTOKEN=91967441>>, ACM, MIR'06, Oct. 26-27, 2006, pp. 61-69.

Office Action for U.S. Appl. No. 11/956,333, mailed on Jul. 27, 2011, Jing Liu, "Estimating Word Correlations from Images".

Office Action for U.S. Appl. No. 11/956,333, mailed on Nov. 18, 2011, Jing Liu, "Estimating Word Correlations from Images", 8 pgs.

Final Office Action for U.S. Appl. No. 11/956,331, mailed on Jul. 8, 2011, Mingjing Li, "Dual Cross-Media Relevance Model for Image Annotation", 21 pgs.

Rui, et al., "A Novel Approach to Auto Image Annotation Based on Pair-wise Constrained Clustering and Semi-naive Bayesian Model", IEEE, In the Proceedings of the 11th International Multimedia Modelling Conference, Jan. 2005, pp. 322-327.

Saber, et al., "Automatic Image Annotation Using Adaptive Color Classification", retrieved at <<http://www.rit.edu/~esseee/docs/15.pdf>>, Graphical Models and Image Processing, vol. 58, No. 2, Mar. 1996, pp. 115-126.

Saykol, et al., "A Semi Automatic Object Extraction Tool for Querying in Multimedia Databases", available at least as early as Nov. 14, 2007, at <<http://www.cs.bilkent.edu.tr/~bilmdg/papers/mis01.pdf>>, Department of Computer Engineering, Bilkent University, Ankara, Turkey, 10 pgs.

Suh, et al., "Semi-Automatic Image Annotation Using Event and Torso Identification", available at least as early as Nov. 14, 2007, at <<http://hcil.cs.umd.edu/trs/2004-15/2004-15.pdf>>, 4 pgs.

Wang, et al., "Automatic Image Annotation and Retrieval Using Subspace Clustering Algorithm", available at least as early as Jun. 12, 2007, at <<http://delivery.acm.org/10.1145/1040000/1032621/p100-wang.pdf?key1=1032621&key2=2890461811&coll=GUIDE&dl=GUIDE&CFID=21121103&CFTOKEN=32821806, ACM, MMDB'04, Nov. 13, 2004, pp. 100-108.

Wang, et al., "Automatic Image Annotation and Retrieval Using Weighted Feature Selection", available at least as early as Jun. 12, 2007, at <<http://www.utdallas.edu/~lkhan/papers/MTA1.pdf>>, 17 pgs.

Wenyin, et al., "Semi-Automatic Image Annotation", available at least as early as at Nov. 14, 2007 at <<http://131.107.65.76/users/marycz/semi-auto-annotatoin--full.pdf>>, 8 pgs.

Barnard, et al., "Matching Words and Pictures", retrieved at <<http://jmlr.csail.mit.edu/papers/volume3/barnard03a/barnard03a.pdf>>, Journal of Machine Learning Research, Feb. 2003, pp. 1107-1135.

Office Action for U.S. Appl. No. 11/956,333, mailed on Jan. 30, 2012, Jing Liu, "Estimating Word Correlations from Images", 7 pgs.

Office action for U.S. Appl. No. 11/956,333, mailed on May 14, 2012, Liu et al., "Estimating Word Correlations from Images", 8 pages.

Office action for U.S. Appl. No. 11/956,331, mailed on Mar. 18, 2013, Li et al., "Dual Cross-Media Relevance Model for Image Annotation", 22 pages.

* cited by examiner

VISUAL AND TEXTUAL QUERY SUGGESTION

BACKGROUND

Traditional search engines receive multitudes of user queries and, in response, search for and provide matching content to the users. In some instances, however, user-submitted queries are ambiguous. That is, the intent of a user submitting a certain query may be unknown. Envision, for instance, that a user submits the query "Mustang" to a search engine. In this instance, it is unclear whether the user wishes to receive content associated with Ford® Mustang® cars or content associated with Mustang horses. Without this information, the traditional search engine is unable to provide the user with content that best matches the desires of the user.

SUMMARY

This document describes tools for better eliciting a true intent of a user that submits a particular search query. These tools receive a search request for content, such as images, associated with a particular query. In response, the tools determine images that are associated with the query, as well as other keywords that are associated with these images. The tools may then cluster, for each set of images associated with one of these keywords, the set of images into multiple groups. The tools then rank the images and determine a representative image of each cluster. Finally, the tools suggest, to the user that submitted the query, to refine the search based on user selection of a keyword and user selection of a representative image. Thus, the tools better elicit and understand the user's intent by allowing the user to refine the search based on another keyword and based on an image on which the user wishes to focus the search.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

Figure 1:
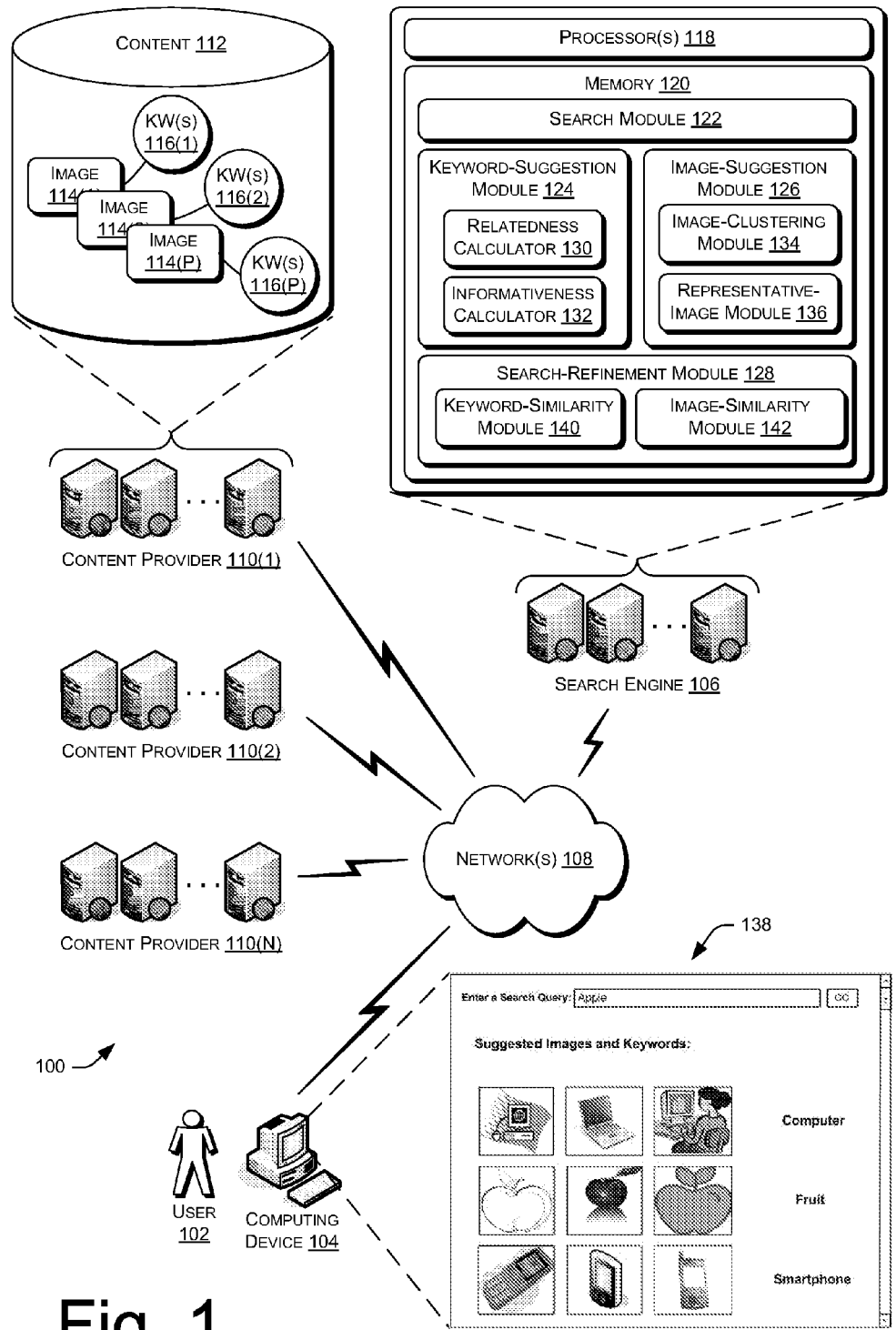
FIG. 1 depicts an illustrative architecture in which users submit search queries to a search engine. In response, the search engine may suggest to the users to refine their searches by selecting an additional keyword and a representative image.

This document describes tools for better eliciting a true intent of a user that submits a particular search query. These tools receive a search request for elements, such as documents, images, video files, audio files or the like, associated with a particular query. In response, the tools determine elements that are associated with the query, as well as other keywords that are associated with these elements and can thus further specify the search intent. The tools may then cluster, for each set of elements associated with one of these keywords, the set of elements into multiple groups. The tools then rank the elements and determine a representative element of each cluster. Finally, the tools suggest, to the user that submitted the query, to refine the search based on user selection of a keyword and user selection of a representative element. Thus, the tools better elicit and understand the user's intent by allowing the user to refine the search based on suggested keywords and based on an element on which the user wishes to focus the search.

For instance, envision that a user submits a request for images that are associated with the query "Apple." The tools may determine that the term "Apple" has many divergent aspects. For instance, the user may have been searching for "Apple" as it relates to fruit, "Apple" as it relates to computers, or "Apple" as it relates to smart phones. As such, the tools may suggest to the user to refine the search based on selection of one of the keywords "Fruit," "Computer," or "Smartphone." While each of these keywords comprises a single word, it is specifically noted that the term "keyword" may comprise a set of multiple words, such as "Smart Phone," "Laptop Computer," and the like. The tools may determine that "Apple" has many divergent aspects by clustering images associated with "Apple" and other keywords (e.g., "Fruit," "Computer," etc.), by analyzing a query log that stores previous queries received from other users, or by any other keyword suggestion method.

Furthermore, the tools may also determine that the images associated with each of these keywords in combination with the original query (e.g., images associated with "Apple Fruit" or "Apple Smartphone") may themselves vary. Therefore, the tools may cluster images associated with these keywords and the original query and may determine a representative image associated with each cluster.

The tools may then suggest both the keywords and a representative image for each cluster associated with the combined query comprising the original query and the selected keyword. For instance, the tools may suggest refining the search to include the keyword "Fruit." Further, the tools may suggest that the user select one of multiple different images of an apple fruit. In response to receiving a selection of this image, the tools may rank the images associated with "Apple Fruit" based on similarity to the selected image. The tools then output, to the user, images associated with "Apple Fruit" in a manner based at least in part on the ranking of the images (e.g., in descending order, beginning with the highest rank). By doing so, the tools allow for better understanding of the user's intent in submitting a request for images and, hence, allow for better service to the user.

While the above example and the following discussion describe implementing the techniques with regards to image searches, it is to be appreciated that these techniques may be implemented in many other contexts. For instance, these techniques may apply equally in searches for documents, videos, audio files, or any other type of content for which a user may search.

The discussion begins with a section entitled "Illustrative Architecture," which describes one non-limiting environment that may implement the claimed tools. A section entitled "Illustrative User Interfaces" follows and illustrates example user interfaces that the techniques may employ for suggesting to a user to refine a search request. A third and final section, entitled "Illustrative Process," pictorially illustrates a process of receiving a search request from a user and, in response, suggesting to the user to refine the search.

This brief introduction, including section titles and corresponding summaries, is provided for the reader's convenience and is not intended to limit the scope of the claims, nor the proceeding sections.

Illustrative Architecture

FIG. 1 depicts an illustrative architecture 100 that may employ the described techniques. As illustrated, architecture 100 includes a user 102 operating a client computing device 104 to access a search engine 106 via a network 108. Client computing device 104 may comprise one of an array of computing devices, such as a personal computer, a laptop computer, a mobile phone, a set-top box, a game console, a personal digital assistant (PDA), a portable media player (PMP) (e.g., a portable video player (PVP) or a digital audio player (DAP)), and the like. Network 108, meanwhile, may comprise the Internet, a Local Area Network (LAN), a Wide Area Network (WAN), a wireless network, and/or the like.

In illustrated architecture 100, user 102 may access search engine 106 for the purpose of conducting a search for content on one or more content providers 110(1), . . . , 110(N). Content providers 110(1)-(N) may comprise websites, databases, or any other entity that includes content 112 that search engine 106 may search in response to receiving a user query. In some instances, user 102 may submit a request to receive images associated with a particular query. As illustrated, each of content providers 110(1)-(N) may store or otherwise have access to one or more images 114(1), . . . , 114(P), each of which may be associated with a set of one or more keywords 116(1), . . . , 116(P). Images 114(1)-(P) may include varying types of visual content (e.g., pictures, artwork, all or a portion of a video file, etc.) having varying formats (e.g., JPEG, PDF, BMP, etc.). Sets of keywords 116(1)-(P), meanwhile, may comprise words that surround the associated image, tags that are assigned to the associated image, or any other words that are otherwise associated with the image. Again, while the following discussion targets image searches, other implementations may implement the techniques for other types of searches (e.g., document searches, video searches, audio file searches, or a combination thereof).

As illustrated, search engine 106 includes one or more processors 118 and memory 120. Memory 120 stores or has access to a search module 122, a keyword-suggestion module 124, an image-suggestion module 126 and a search-refinement module 128. In response to receiving a request from user 102 for images in the form of the received query, search module 122 may search one or more of content providers 110(1)-(N) for images that are associated with the received query. As is known, search module 122 may also rank the images associated with the query. As such, search module 122 may function in a manner that is the same or similar as a traditional search engine.

After determining images that are associated with a particular search query, however, search engine 106 may suggest to user 102 to further refine the image search based on one or more keywords and based on one or more images. To do so, keyword-suggestion module 124 may first determine one or more keywords that are associated with the images that are associated with the received query. Image-suggestion module 126 may then determine one or more images that are associated with the one or more keywords.

For instance, envision that user 102 requests to receive images that are associated with the search query "Apple." In response to receiving this query, search module 122 may determine images that are associated with this query. Keyword-suggestion module 124 may then determine one or more keywords that are related to the images that are associated with the query "Apple." To do so, module 124 may analyze text that surrounds the images, tags that are associated with the images, or may otherwise determine keywords that are sufficiently associated with the images.

In one implementation, module 124 searches for images that are available on a collaborative-image site, such as a photo-sharing website. Module 124 then analyzes the tags that users of the collaborative site have associated with the images. Keyword-suggestion module 124 then considers these tags as keyword candidates for a particular image. In another implementation, meanwhile, module 124 analyzes the text surrounding a particular image to determine keyword candidates.

To determine which of multiple keyword candidates to suggest as keywords, keyword-suggestion module 124 includes a relatedness calculator 130 and an informativeness calculator 132. Relatedness calculator 130 functions to determine which of the keyword candidates associated with the images are sufficiently related to the images that are associated with search query. For instance, calculator 130 may determine how frequently each word is associated with the images. For instance, if calculator 130 determines that the word "Computer" is found as a keyword on images that are associated with "Apple" more frequently than the term "Banana," then calculator 130 may determine that the word "Computer" is more related to the query "Apple" than is the word "Banana."

Informativeness calculator 132, meanwhile, attempts to find keywords that are each informative enough (when coupled with the original query) to reflect a different aspect of the original query. Returning to the example of the search query "Apple," calculator 132 may determine that the words "Computer," "Fruit" and "Smartphone" each reflect diverse aspects of the query "Apple." To make this determination, calculator may determine that images associated with the query "Apple Computer" make up a very different set of images than sets of images associated with the queries "Apple Fruit" and "Apple Smartphone," respectively.

In some instances, keyword-suggestion module 124 combines the input from relatedness calculator 130 with the input from informativeness calculator 132 to determine a set of keywords associated with the originally-inputted query. By doing so, keyword-suggestion module 124 determines a set of keywords that are sufficiently related to the original query and that sufficiently represent varying aspects of the original query. In some instances, module 124 sets a predefined number of keywords (e.g., one, three, ten, etc.). In other instances, however, module 124 may set a predefined threshold score that each keyword candidate should score in order to be deemed a keyword, which may result in varying numbers of keywords for different queries.

Once keyword-suggestion module 124 determines a set of keywords (e.g., "Fruit," "Computer," and "Smartphone") associated with a particular query (e.g., "Apple"), image-suggestion module 126 may determine more images to suggest in unison with the keywords. To do so, image-suggestion module 126 includes an image-clustering module 134 and a representative-image module 136.

Image-clustering module 134 first determines images that, for each keyword, are associated with both the keyword and the query. For instance, module 134 may determine images that are associated with the combined query "Apple Fruit." Module 134 then clusters these images into multiple groups based on similarities or dissimilarities amongst these images. For instance, one group may comprise images of red apples, while another group may comprise images of green apples. Next, representative-image module 136 may then determine, for each cluster, a representative image of each cluster, as discussed in detail below.

Once keyword-suggestion module 124 determines a set of keywords associated with a received query and image-suggestion module determines representative images of clusters therein, search engine 106 may suggest to user 102 to refine the search request based on selection of a keyword and a representative image. For instance, search engine 106 may output a user interface 138 to user 102 that allows user 102 to select a keyword (e.g., "Fruit") and an image associated with a cluster of that keyword (e.g., an image of a red apple).

Upon receiving a selected keyword and image, search-refinement module 128 may refine the user's search. First, a keyword-similarity module 140 may search for or determine the images that are associated with the query and the keyword ("Apple Fruit"). Next, an image-similarity module 142 may compare the image selected by user 102 (e.g., the red apple image) with the images associated with the original query and the keyword (i.e., the images associated with "Apple Fruit"). These images may be ranked according to image similarity and may be output to user 102 in a corresponding manner.

By refining the search based on a keyword and an image, search engine 106 likely provides user 102 with images that more closely match the original intent of user 102 when user 102 submitted the query "Apple." Having described an illustrative architecture that may implement the claimed techniques, the following discussion provides illustrative user interfaces that a search engine or another entity may serve to users such as user 102 to refine search requests.

Illustrative User Interfaces

Figure 2:
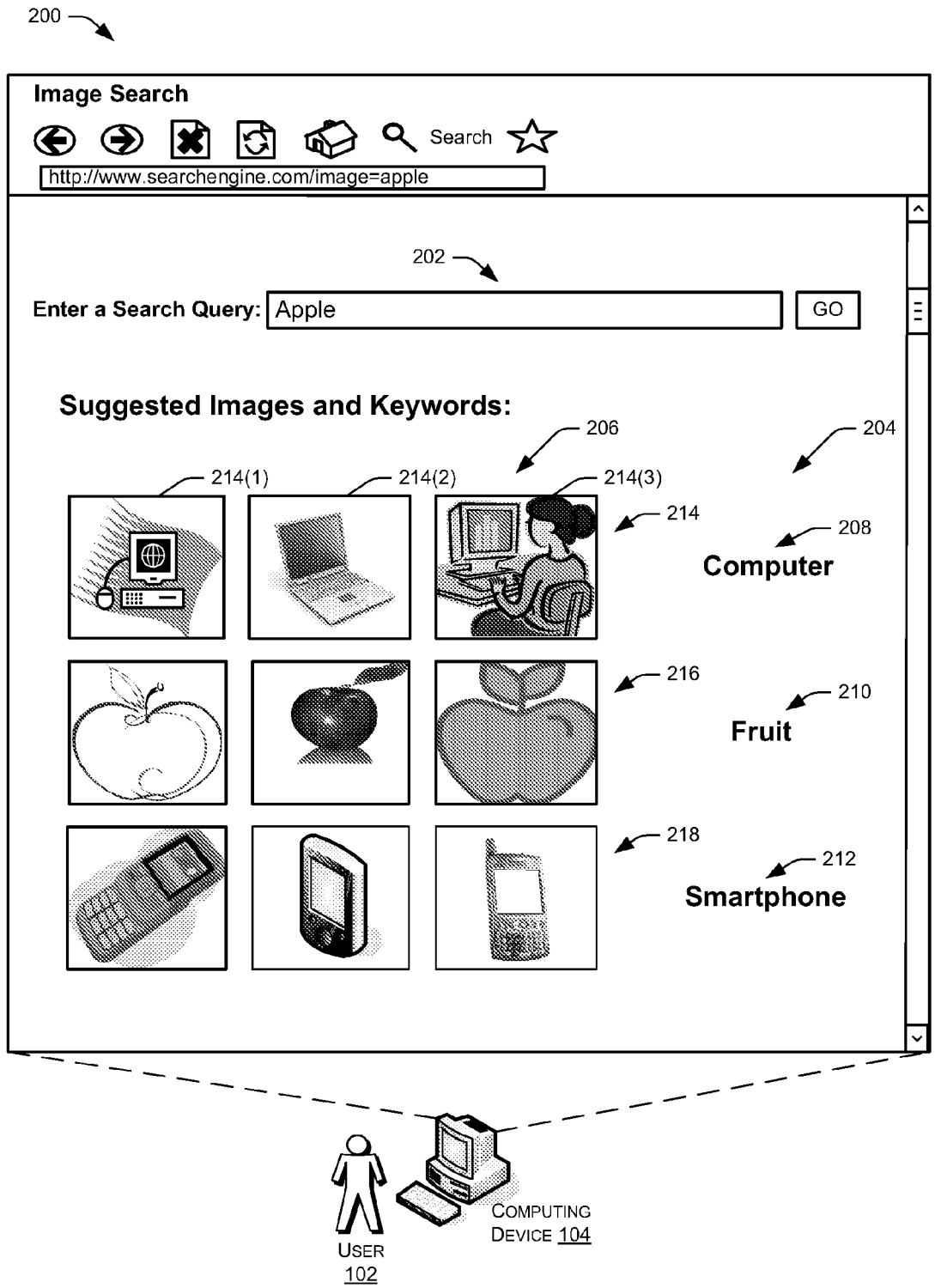
FIG. 2 depicts an illustrative user interface (UI) that the search engine may serve to a client computing device in response to receiving a search query. As illustrated, this UI suggests that the user refine the search request for images associated with the query "Apple" by selecting an additional keyword and an image.

FIG. 2 depicts an illustrative user interface (UI) 200 that search engine 106 may serve to computing device 104 in response to receiving a search query from user 102. For instance, search engine 106 may serve UI 200 in response to receiving the search query "Apple" from user 102. As illustrated, UI 200 suggests that the user refine the search request for images associated with the query "Apple" by selecting an additional keyword and an image.

User interface 200 includes a text box 202 in which user 102 inputted the original query "Apple." User interface 200 also includes one or more keywords 204 and one or images 206 that user 102 may select to refine the search. Keywords 204 include a keyword 208 entitled "Computer," a keyword 210 entitled "Fruit," and a keyword 212 entitled "Smartphone." Each of keywords 208, 210, and 212 is associated with a set of images 214, 216, and 218, respectively. While FIG. 2 illustrates three keywords and three images, other implementations may employ any number of one or more keywords and any number of one or more images.

As illustrated, set of images 214 associated with the keyword "Computer" includes images 214(1), 214(2), and 214(3). Just as each of keywords 208-212 represent a different aspect of the query "Apple," each of images 214(1)-(3) represent a different cluster of images within the keyword. That is, each of images 216 may comprise a representative image of one of three clusters associated with combined query "Apple Computer."

In response to receiving UI 200 at device 104, user 102 may select a keyword and one or more images on which to refine the image search. For instance, user could select one image of an apple from images 216 (e.g., an image of a red apple). By doing so, user 102 would be choosing to refine the search to include images associated with the query "Apple Fruit." And, more particularly, user 102 would be choosing to refine the search to specify images that are similar to the selected image (e.g., the red apple). User 102 may select this image with use of a cursor, a keyboard, or via any other selection means.

As opposed to selecting a single image, in some instances, user 102 may simply select a row of images. By doing so, user 102, in effect, simply selects a keyword rather than a particular image. In these instances, the images may have been helpful to providing user 102 with a visual cue of the corresponding keyword (e.g., "Fruit"), while the refined search is simply based on the new query "Apple Fruit".

Figure 3:
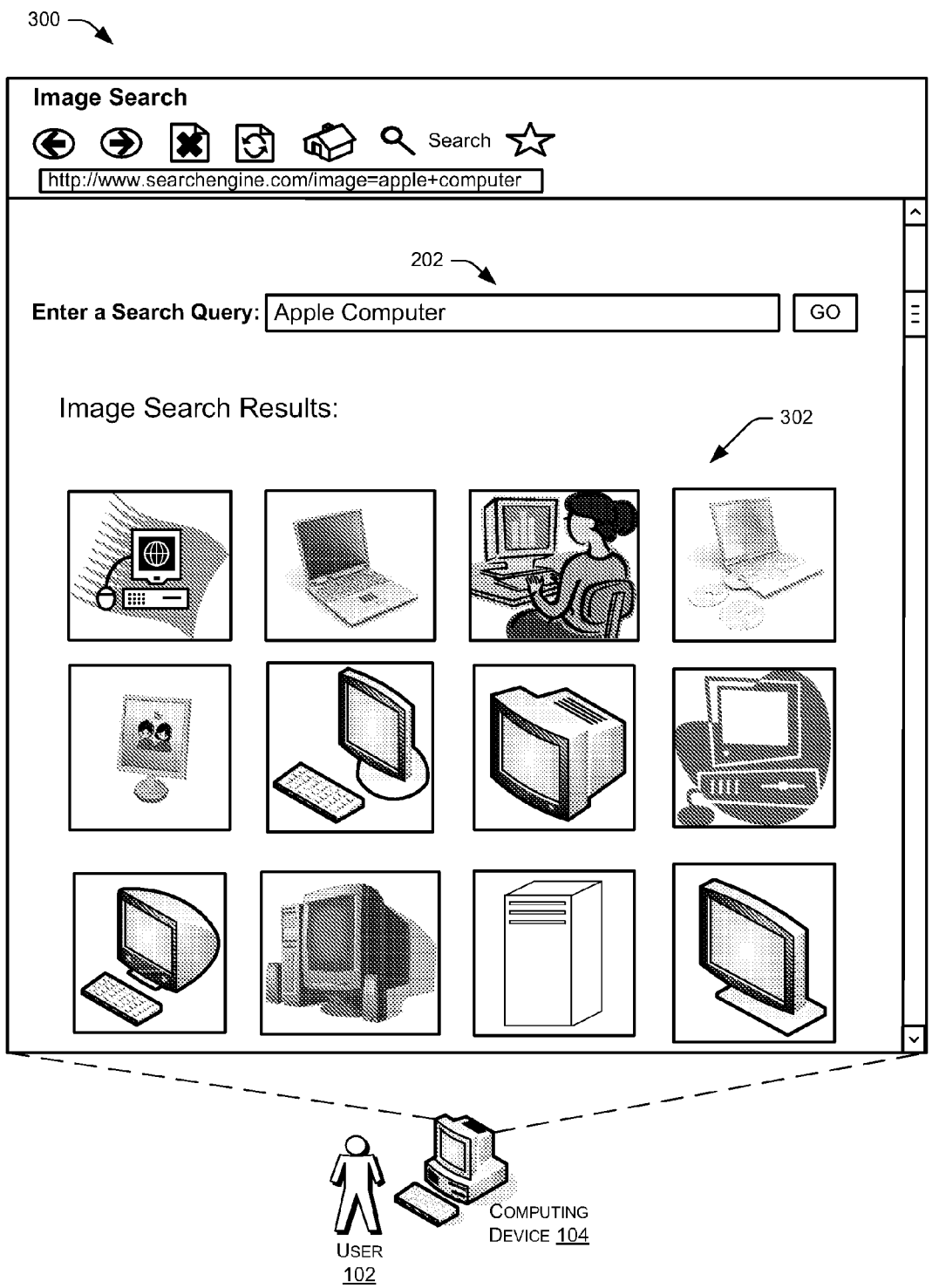
FIG. 3 depicts an illustrative UI that the search engine may serve to the client computing device in response to receiving a user selection of a keyword "computer" and a particular image from the UI of FIG. 2. As illustrated, this UI includes multiple images that are associated with the query "Apple Computer" and with the image selected by the user.

FIG. 3 represents a user interface (UI) 300 that search engine 106 may serve to device 104 after user 102 selects a particular image associated with keyword 208 ("Computer") of UI 200. As illustrated in text box 202, in response to receiving the user selection, search engine 106 ran a search of content providers 110(1)-(N) for images associated with the refined query "Apple Computer." Furthermore, search engine 106 may have compared these images with the user-selected image in order to determine a similarity there between. Search engine 106 may have then ranked these images based on the determined similarities to present a set of images 302 in a manner based at least in part on the ranking. For instance, those images determined to be most similar to the selected image may be at or near the top of UI 300 when compared to less similar images.

Figure 4:
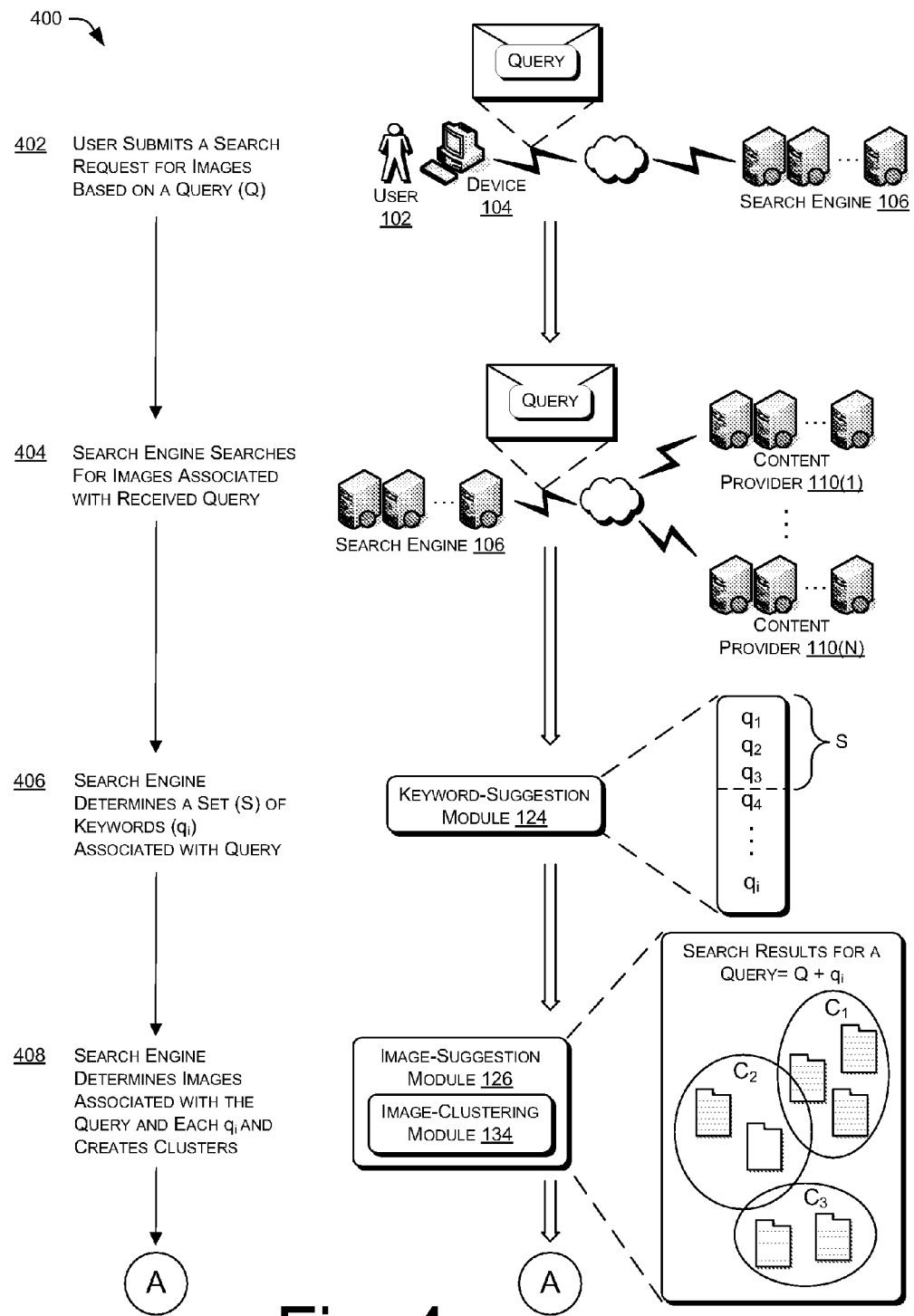
FIGS. 4-5 depict an illustrative process for suggesting that a user refine a search request for images based on selection of an additional keyword and a representative image.
Figure 5:
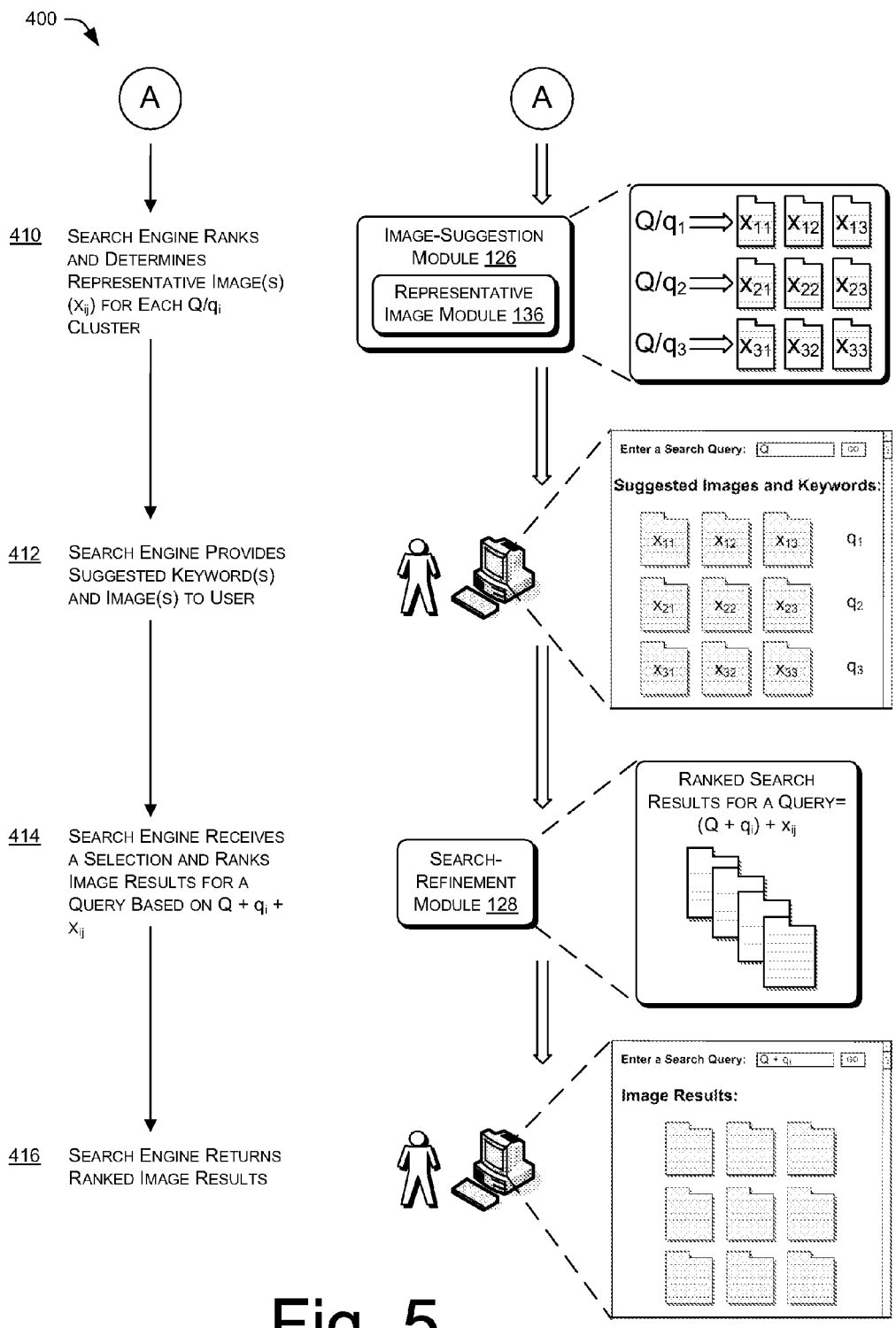

Having illustrated and described example user interfaces that search engine 106 or another entity may serve to a user computing device, FIGS. 4-5 illustrates an example process for implementing the claimed techniques.

Illustrative Processes

FIGS. 4-5 depict an illustrative process 400 for suggesting to a user to refine a search based on selection of both a keyword and an image. This process is illustrated as a logical flow graph, which represents a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the illustrated process may describe the operations as being done "online," some or all of the operations may be computed "offline" in other implementations.

Generally, process 400 describes techniques for providing both keyword and image suggestions in response to receiving a search query in order to help users express the search intent of the user more clearly. Therefore, the provided suggestions should be informative enough to help the user specify the desired information. That is, each query suggestion should reflect an aspect of the initial query. For example, given the query "Golden Gate," process 400 may desire to suggest keywords such as "Night," "Sunny," or "Fog," each of which can make the query more specific when compared with a keyword such as "San Francisco." While this latter keyword ("San Francisco") is common, it is not very informative when coupled with the original query of "Golden Gate."

Once a user chooses a keyword-image suggestion, the selected keyword may be appended to the initial query, which results in a composite or combined query. The techniques may then first search for images that are associated with the composite textual query. Next, the process may further refine the search results by using the selected suggested image as a query example. The final results are then presented to the user. In most instances, these final results more adequately conform to the intent of the searching user than when compared with traditional image-search techniques.

As discussed above, a key portion of the described techniques includes determining keyword and image suggestions that reduce the ambiguity of an initial query. Another key portion of the techniques include refining the text-based search results by leveraging the visual cue in the form of the selected suggested image.

As discussed above, one approach to generate keyword-image query suggestion includes mining search results for text that surrounds the initial search results. Also as discussed above, another approach includes analyzing images that users of a collaborative community (e.g., a photo-sharing service) have tagged. In some instances, the latter technique has at least two advantages: (1) the resulting suggestion can be provided without performing initial search (i.e., the suggestion candidates are actually generated offline, making the query suggestion more efficient), and (2) the suggestion might not suffer from the unsatisfying quality of the initial search results and, as such, may lead to more effective suggestions.

In some instances, the described techniques implement a two-step approach to generating the keyword-image suggestions. First, a statistical method is proposed to suggest keywords (e.g., tags or text surrounding initial search results) that can reduce the ambiguity of the initial query. After that, for each keyword suggestion, the techniques may collect the images associated with both the initial query and the suggested keyword and cluster these images into several groups or clusters. Each cluster represents a different aspect of the combined query, and the techniques select the most representative images from the clusters to form the image suggestions.

Finally, the techniques refine the text-based results by using visual information of the selected suggested image. That is, the techniques compare the selected suggested image to the text-based image search results to determine a similarity there between. In some instances, the techniques employ content-based image retrieval (CBIR) to compare these images based on one or more visual modalities, such as color, texture, and shape. The techniques may then rank and reorder the search results based on the determined visual similarities Returning to FIG. 4, process 400 includes operation 402, which represents user 102 submitting, and search engine 106 receiving, a request for images associated with a query, Q. Continuing the example from above, user 102 may submit the search query "Apple," or user 102 may submit any other query comprising one or more other words. Next, operation 404 represents that search engine 106 may, in response, determine images that are associated with the submitted query, using known techniques or otherwise.

Next, operation 406 represents that search engine 106 (and/or another entity) may determine a set, S, of one or more keywords, $q_i$, that are associated with the images associated with the query. For a given ambiguous query Q (e.g., "Apple"), operation 406 attempts find a set of keywords from the union of all the keywords S. Such keywords should be able to resolve the ambiguity of Q and thus they should be both sufficiently related to the initial query and sufficiently informative to diversely reflect different aspects of the initial query. Again, the example query "Apple" has various potential meanings. Therefore, the techniques may strive to suggest "Fruit," "Computer," and/or "Smart Phone." Each of these keywords is inherently related to "Apple" and reflects a different aspect of "Apple," thus removing the ambiguity.

Here, a probabilistic formulation may simultaneously address the two properties in a single framework. To address the first, the relatedness between each keyword, $q_i$, and the initial query, Q, may be measured with their co-occurrence. That is, the co-occurrence of ($q_i$, Q) may be calculated and normalized by the frequency of Q as $p(q_i|Q)=I(q_i \cap Q)/I(Q)$. I(Q) denotes the number of images associated with Q, while $I(q_i \cap Q)$ is the number of images that contain both the keyword and Q. Equation one, below, may then define the relatedness between $q_i$ and Q:

$$R(q_i, Q) = f(p(q_i|Q)), \quad (1)$$

where f( ) is a monotonically increasing function.

To address the second issue, operation 406 aims to find a set of keywords that can diversely reflect various aspects of the initial query, Q. In other words, each selected keyword should be informative enough to reflect one unique facet of the initial query, Q. Meanwhile, this facet should be different from those characterized by other keywords. Here, we assume that a first keyword, $q_i$, and a second keyword, $q_j$, reflect two different aspects of Q when the respected keyword ($q_i$ or $q_j$) is appended to Q. That is, combining Q with one of the first or second keywords can give rise to very different distribution over the remaining keywords. That is to say, $q_i$ and $q_j$ can resolve the ambiguity of Q if the distribution $p(q|Q \cup \{q_i\})$ and $p(q|Q \cup \{q_j\})$ are highly different. For example, given the keyword "Apple," appending "Fruit" or "Computer" leads to very different meanings. To measure the distribution difference that arises from queries that include $q_i$ or $q_j$, the techniques may use the symmetric Kullback-Leibler (KL) divergence as $S\_KL(q_i \| q_j) = KL(q_i \| q_j) + KL(q_j \| q_i)$, where:

$$S\_KL(q_i \| q_j) = \Sigma_q p(q|Q \cup \{q_i\}) \log [(p(q|Q \cup \{q_i\}))/[p(q|Q \cup \{q_j\})]] \quad (2)$$

Based on this, the informativeness of $q_i$ and $q_j$ with respect to Q are defined as the following:

$$D(q_i, q_j, Q) = g(KL(q_i, q_j)), \quad (3)$$

where g( ) is a monotonically increasing function.

Thus, the informativeness of a keyword set can be measured as $\Sigma_{q_j, q_k \in S_Q} D(q_j, q_k, Q)$.

To simultaneously capture the relatedness and informativeness, both parameters may be aggregated into a single formulation as:

$$S_Q^* = \operatorname*{argmax}_{S_Q} \frac{\lambda}{|S_Q|} \sum_{q_i \in S_Q} R(q_i, Q) + \frac{(1-\lambda)}{C_{|S_Q|}^2} \sum_{q_j, q_k \in S_Q} D(q_j, q_k, Q) \quad (4)$$

where λ is a weight parameter that is used to trade-off the two properties.

Solving Equation 4, then, results in the optimal keyword suggestions. However, since solving the equation is a non-linear integer programming (NIP) problem, directly solving the equation may require searching in a large solution space and may be computationally intractable. Alternatively, the following greedy strategy, which includes a function "L" that is the utility of selecting one or multiple suggested queries and which is illustrated below in Table 1, may be used to solve this equation in some instances:

TABLE 1

Keyword suggestion generation algorithm

Input: S, Q
Output: S*$_Q$
Initialize S*$_Q$ = φ
for each iteration t do
    S$^t_Q$ = φ, L(S$^t_Q$) = 0;
    random select the first keyword q
    from S \ S$^t_Q$; S$^t_Q$ = S$^t_Q$ ∪ {q};
    (a) select the next keyword q$_i$ from S \ S$^t_Q$
    by solving
    arg max L(q$_i$) = arg q$_i$ max λR(q$_i$,Q) + (1 −
λ)/ | S$^t_Q$ |$^{qi}$ Σ$_{qj ∈ S^t_Q}$ D(q$_i$, q$_j$, Q)
    L(S$^t_Q$)+ = L(q$_i$)
    if ΔL(S$^t_Q$) > e where e is a threshold go
        S$^t_Q$ = S$^t_Q$ ∪ {q$_i$}
        go to (a);
    else
        end this iteration;
    end if
end for
return S*$_Q$ = arg $_t$max L(S$^t_Q$)

Moreover, for any given Q, most keywords have very small relatedness R(q, Q). Thus the techniques can perform a pre-filtering process by setting a threshold, such that only the candidates that have R(q, Q) above the threshold are taken into consideration. This will further accelerate the keyword suggestion generation process.

Having selected a set of keywords, S, process 400 proceeds to determine images for suggestion. To do so, operation 408 determines images that are associated with the initial query, Q, and each respective keyword, q. The suggested images should be informative enough to assist users to clarify their search intent effectively. Because the visual content of the image set usually varies intensively, operation 408 also clusters the image sets into one or more groups or clusters. Process 400 then chooses a representative image for each cluster, as discussed in detail below. By clustering the images associated with the initial query and each keyword, the selected representative images should be diverse enough to comprehensively summarize the corresponding keyword. In some instances, operation 408 may adopt a sparse Affinity Propagation (AP) method to cluster the images and find the representative images.

Based on the collected image set X={$x_1, x_2, \ldots, x_n$} for (Q, q), and the similarity measure s($x_i$, $x_j$) between two images, the techniques desire to cluster X into m (m<n) clusters. FIG. 5 continues the illustration of process 400, and illustrates that search engine 106 may determine representative images (an "exemplar") of each cluster at operation 410. In affinity propagation, each of the images may be considered as potential exemplars. Further, each image is regarded as a node in a network, and the real-valued message is recursively transmitted via the edges of the network until a sufficient set of exemplars and corresponding clusters emerge. Let Xe={$x_{e1}, x_{e2}, \ldots, x_{em}$} denote the final exemplars and e(x) represent the exemplar of each image. In brief, this Affinity Propagation approach propagates two kinds of information between each two images: the "responsibility" transmitted from image i to image j, which measures how well-suited $x_j$ is to serve as the exemplar for $x_i$ considering other potential exemplar for $x_i$, and the 'availability' a(i, j) sent from candidate exemplar $x_j$ to $x_i$, which reflects how appropriate $x_i$ choose $x_j$ as exemplar considering other potential images that may choose $x_j$ as their exemplar. These information are iteratively updated as $$r(i,j) \leftarrow s(x_i,x_j) - \max_{j \neq j'}\{a(i,j') + s(x_i,x_{j'})\},$$

$$a(i,j) \leftarrow \min\{0, r(j,j)\} + \Sigma_{i' \neq j}\max\{0, r(i',j)\}. \quad (5)$$

The "self-availability," meanwhile, a(j, j) may be updated differently as follows:

$$a(j,j) := \Sigma_{i' \neq j}\max\{0, r(i',j)\}. \quad (6)$$

The above information is iteratively propagated until convergence. Then, the exemplar e($x_i$) for each $x_i$ is chosen as e($x_i$)=$x_j$ by solving the following:

$$\arg\max_j r(i,j) + a(i,j)$$

Note that while the original Affinity Propagation algorithm that uses full similarity matrix leads to a high computational cost of O(n$^2$T) where T is the number of iterations. A solution to improve the speed is to perform the Affinity Propagation on a sparse similarity matrix instead of the full one. This can be accomplished by constructing a sparse graph structure G=(v, ε). The sparse graph G can be constructed using the k-nearest neighbor strategy. For each data point, the techniques may find k-nearest neighbors, each of which is then connected to the data point via an edge.

Based on the sparse graph, the Affinity Propagation algorithm can be implemented more efficiently since the information propagation only needs to be performed on the existing edges. However, when the techniques perform the Affinity Propagation on such sparse graph, each data point can and only can be the exemplar of k+1 data points (its neighbors and itself). That is to say, there are at least n/k exemplars, which are much more than expected. To ameliorate this issue, the techniques adopt an edge refinement method proposed that is summarized in Table 2 below. In each iteration, multiple exemplars may be merged into one cluster. Thus the Affinity Propagation on the reconstructed graph may generate fewer exemplars. Once the number of exemplars is reduced to a desirable value, the iteration can be ended. Then, the final exemplars are regarded as the image suggestions.

TABLE 2

Iteratively edge refinement algorithm

Input: X, G
Output: X$_e$
Initialization: Set G$^0$ = G
for each iteration t do
    Generate X$_e^t$ with AP on G$^{t−1}$; X$_e$ = X$_e^t$
    Construct G$^t$ based on X$_e^t$ and G$^{t−1}$
    (1) For each $x_x$ ∈ X$_e^t$, if $x_x$ is the exemplar
    of $x_j$, then an edge between $x_i$ and $x_j$ is
    added;
    (2) For $x_k$, $x_l$ ∈ X$_e^t$, if there are two data
    points $x_m$, $x_n$ that are the neighbor to each
    other and satisfy e($x_m$) = $x_k$ and
    e($x_n$) = $x_l$, then $x_k$, $x_l$ are connected by
    an edge;
    (3) For $x_k$, $x_l$ ∈ X$_e^t$, if they are connected
    in (2), then all data points that choose $x_k$
    as exemplar are connected to $x_l$, and
    vice versa;
end for
return X$_e$.

Next, operation 412 represents that search engine 106 may return, to the client computing device 104 of user 102, the suggested keywords and images for selection in order to refine the image search. For instance, search engine 106 may return the keywords "Computer," "Fruit," and "Smart Phone," along with representative images of clusters therein.

In response, user 102 may select a keyword and an image from the rendered user interface. In some instances, the user selects both the keyword and the image by selecting, from the UI, an image that is associated with a particular keyword (and, in some instances, associated with a particular cluster of the keyword). At operation 414, search engine 106 receives the selection and, in response, attempts to rank and return images according to the selection. That is, the search engine analyzes the images that associated the combined query "Q+$q_i$" (e.g., "Apple Fruit") and then ranks the images associated with the combine query according to each image's similarity to the selected image. In some instances, this comparison is made on the basis of color, texture, and/or shape similarity.

In one embodiment, search engine 106 (or another entity) may first determine a threshold number of images that are associated with the combined query. For instance, search engine 106 may determine the top 1000 images that are associated with the combined query "Apple Fruit." Then, search engine 106 may compare the selected image against these 1000 images and rank these images according to the determined textual and visual similarities. In other instances, however, search engine 106 may take into account both textual and visual similarities simultaneously. That is, the search engine might not choose to determine a predefined number (e.g., 1000) of images to compare for visual similarity.

While the claimed techniques may implement many different ranking methods, one example method is described below. In this example, let the vector $r=[r_1, r_2, \ldots, r_N]$ denote the ranking scores of image set $X=\{x_1, x_2, \ldots, x_N\}$. In other words, each $r_i$ represents the relevance between $x_i$ and the combined textual query. Note that the initial rank list from the keyword-based search is described as $r_t=[r_{t1}, r_{t2}, \ldots, r_{tN}]^T$. As mentioned above, the suggested image chosen by the user very likely inherently reflects the search intent of the user. Therefore, the techniques aim to reorder the initial rank list by processing the visual information of the image suggestion against those of the retrieved images. That is, the techniques desire to generate new ranking scores based on the visual information. Here the techniques may exploit multiple visual modalities, such as color, texture, and/or shape in order to produce multiple visual-based score lists.

Suppose, for instance, that we have K visual modalities. Let $x_q$ denote the suggested image chosen by the user. First, the techniques calculate the similarity $s_{vk}(x_i, x_q)$ between $x_q$ and each retrieved image $x_i$ on the k-th visual modality. Then the ranking score of $x_i$ is obtained as $r_{vki}=s(x_i, x_q)$. As a result, the score list $r_{vk}=[r_{vk1}, r_{vk2}, \ldots, r_{vkN}]^T$ based on k-th visual modality is obtained.

Then the K visual-based score lists and the initial text-based score list are aggregated to produce the final list $r=[r_1, r_2, \ldots, r_N]^T$ as:

$$r_i = \alpha_t r_{ti} + \Sigma_{k=1}^K \alpha_{vk} r_{vki},$$

$$s.t. \alpha_t + \Sigma_{k=1}^K \alpha_{vk} = 1; i=1, \ldots, N. \quad (7)$$

where $\alpha_t$ and $\alpha_k$ are the weight parameters to trade-off the multiple modalities including textual and visual ones. Since the ranking scores over different modalities may vary significantly, the techniques may use the normalized scores instead of the original ones in Eq. (7). For the list $r_t=[r_{t1}, r_{t2}, \ldots, r_{tN}]^T$, the scores are normalized such that they with zero mean and unit variance.

After obtaining the final ranking score list, operation 416 may return the ranked image results in a manner based at least in part on the ranking score list. For instance, search engine 106 may serve the images to computing device 104 for rendering to the user in descending order. Because the user's intent reflected by the image suggestion is incorporated into the re-ranking procedure, the final search results are typically more consistent with user's intent in submitting the original query.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
   receiving, at a first computing device, a search request from a second computing device of a user, the search request for images associated with a textual query;
   determining, by the first computing device and based at least in part on the received textual query, multiple images that are associated with the received textual query;
   determining, by the first computing device, a first keyword that is associated with a first set of the multiple images and determining, by the first computing device, a second keyword that is associated with a second set of the multiple images;
   clustering, by the first computing device, the first set of the multiple images into two or more clusters and clustering, by the first computing device, the second set of the multiple images into two or more clusters;
   determining, by the first computing device: (i) an image from the first cluster of the first set of the multiple images that is representative of the first cluster of the first set of the multiple images; (ii) an image from the second cluster of the first set of the multiple images that is representative of the second cluster of the first set of the multiple images; (iii) an image from the first cluster of the second set of the multiple images that is representative of the first cluster of the second set of the multiple images, and (iv) an image from the second cluster of the second set of the multiple images that is representative of the second cluster of the second set of the multiple images;
   providing the first keyword and the second keyword and the respective representative images of the first and the second clusters of the first set and the respective representative images of the first and the second clusters of the second set, to the second computing device of the user, in a suggestion to refine the search request based at least on the first keyword or the second keyword and based at least on one of the respective representative images; and
   responsive to receiving a selection of one of the first keyword or the second keyword and a selection of one of the respective representative images, refining the search request based at least on the selected keyword and based at least on the selected representative image.

2. The method as recited in claim 1, the refining of the search request comprises:
   ranking images that are associated with the received textual query based at least on a similarity of each of the images to: (i) the selected keyword, and (ii) the selected representative image; and
   outputting one or more of the images based at least in part on the ranking.

3. The method as recited in claim 1, wherein determining the first keyword and the second keyword further comprises analyzing a query log that stores previous queries.

4. The method as recited in claim 1, the providing the first keyword and the second keyword and the respective representative images of the first and the second clusters of the first set and the respective representative images of the first and the second clusters of the second set, to the second computing device of the user, in a suggestion comprises causing display of the first and the second keywords and the images that are each representative of a respective cluster, and the receiving of the selection comprises receiving a selection of a displayed representative image.

5. A method comprising:
receiving, at a search engine, a request, sent over a communications network, for images that are associated with a query;
determining a plurality of images that are associated with the received query;
determining a plurality of keywords based at least in part on at least one of the plurality of images and the query, wherein each keyword is associated with a corresponding subset of determined images, each subset of determined images being a part of the plurality of determined images;
for each respective subset of the determined images, determining at least one image of the respective subset that is representative of the respective subset of the determined images;
suggesting to refine the request for images based at least on selection of one of the multiple keywords and based at least on selection of one of the representative images; and
refining the request based at least on both the selected keyword and the selected representative image.

6. The method as recited in claim 5, the determining a plurality of keywords based at least in part on at least one of the plurality of images and the query comprises defining a different aspect of the received query for each of the multiple keywords.

7. The method as recited in claim 5, the determining at least one image of the respective subset that is representative of the respective subset of the determined images comprises:
for each respective subset of the multiple images that is associated with a respective keyword, clustering the subset of the multiple images into at least a first group of images and a second group of images; and
determining a first image that is representative of the first group and a second image that is associated with the second group.

8. The method as recited in claim 7, the suggesting to refine the request comprises providing, for each respective subset of the multiple images, the image that is representative of the first group and the image that is representative of the second group.

9. The method as recited in claim 5, further comprising:
receiving a selection of one of the multiple keywords and a selection of a representative image; and
responsive to the receiving of the selection, refining the request based at least on the selected keyword and the selected representative image.

10. The method as recited in claim 9, the refining the request comprises:
determining a similarity between: (i) each of multiple images that are associated with the received query, and (ii) the selected keyword;
determining a similarity between: (i) each of the multiple images that are associated with the received query, and (ii) the selected representative image; and
ranking the multiple images that are associated with the received query based at least in part on the determined similarities.

11. The method as recited in claim 10, the determining a similarity between: (i) each of multiple images that are associated with the received query, and (ii) the selected representative image comprises determining the similarity based at least on one of color similarity, texture similarity, or shape similarity.

12. A computing device comprising:
a search engine configured to:
receive a request for images associated with a query;
determine images that are associated with the received query;
determine keywords that are associated with the determined images, wherein each of the determined keywords is associated with a group of the images that are associated with the received query;
cluster, for each keyword, the group of images associated with the respective keyword into multiple clusters;
for each cluster of the multiple clusters, determine an image of the cluster that is representative of the cluster;
provide in a suggestion a plurality of keywords of the determined keywords and a plurality of images of the determined images, each provided image being associated with a respective keyword of the provided keywords, to refine the request based at least on selection of one keyword of the determined keywords and selection of an image that is associated with the selected keyword; and
refine the query based at least on both the selected keyword and the selected image.

13. The computing device as recited in claim 12, wherein the search engine is further configured to analyze a query log that stores queries previously received from computing devices of other users to determine keywords that are associated with the determined images, and wherein, to suggest to refine the request, the search engine is further configured to suggest a keyword found within the analyzed query log.

14. The computing device as recited in claim 12, wherein the search engine is further configured to analyze tags that a community of users has associated with the images that are associated with the received query to determine keywords that are associated with the determined images.

15. The computing device as recited in claim 12, wherein to determine keywords that are associated with the determined images the search engine is further configured to:
determine a first keyword that is associated with multiple images of the determined images, the first keyword reflecting a first aspect of the received query; and
determine a second keyword that is associated with multiple images of the determined images, the second keyword reflecting a second aspect of the received query that is different than the first aspect.

16. The computing device as recited in claim 12, wherein to suggest to refine the request the search engine is further configured to provide, for user selection, the multiple keywords and each image that is representative of a cluster of a group of images associated with a keyword.

17. The computing device as recited in claim 12, wherein the search engine is further configure to receive a selection of an image that is associated with a keyword in response to the suggestion to refine the request and the search engine is further configured to:
  determine a similarity between: (i) each of multiple images that are associated with the received query, and (ii) the selected keyword; and
  determine a similarity between: (i) each of multiple images that are associated with the received query, and (ii) the selected image that is associated with the keyword.

18. The computing device as recited in claim 17, wherein the search engine is further configure to:
  determine a ranking of at least a portion of the multiple images that are associated with the received query based at least on the determined similarities; and
  output images for user selection at least in part based upon the ranking.

* * * * *